(12) United States Patent
Aliakbarian et al.

(10) Patent No.: US 11,135,131 B2
(45) Date of Patent: Oct. 5, 2021

(54) MEDICATION BOTTLE WITH ANTI-TAMPERING FEATURES

(71) Applicant: Board of Trustees of Michigan State University, East Lansing, MI (US)

(72) Inventors: Bahar Aliakbarian, Midland, MI (US); Muhammad Rabnawaz, East Lansing, MI (US); Susan E. Selke, East Lansing, MI (US); Krystal Cheng, Fresh Meadows, NY (US); Arun Ross, East Lansing, MI (US); Austin Cozzo, Lansing, MI (US); Anurag Chowdhury, East Lansing, MI (US); Ali Tamayol, Providence, RI (US); Carina Russell, Fullerton, NE (US); Prem Chahal, Okemos, MI (US)

(73) Assignees: Board of Trustees of Michigan State University, East Lansing, MI (US); Board of Regents of the University of Nebraska, Lincoln, NE (US)

( * ) Notice: Subject to any disclaimer, the term of this patent is extended or adjusted under 35 U.S.C. 154(b) by 47 days.

(21) Appl. No.: 16/569,747

(22) Filed: Sep. 13, 2019

(65) Prior Publication Data

US 2020/0085686 A1     Mar. 19, 2020

Related U.S. Application Data

(60) Provisional application No. 62/731,263, filed on Sep. 14, 2018.

(51) Int. Cl.
*A61J 1/03*      (2006.01)
*B65D 25/04*     (2006.01)
(Continued)

(52) U.S. Cl.
CPC ............... *A61J 1/03* (2013.01); *B65D 25/04* (2013.01); *B65D 50/00* (2013.01); *B65D 55/02* (2013.01); *G07C 9/257* (2020.01); *A61J 2205/60* (2013.01)

(58) Field of Classification Search
CPC .......... A61J 1/03; A61J 7/0481; G07C 9/257; B65D 25/04; B65D 50/00; B65D 55/02; B65D 2401/00
See application file for complete search history.

(56) References Cited

U.S. PATENT DOCUMENTS

| | | | | |
|---|---|---|---|---|
| 4,755,405 A | * | 7/1988 | Massucco | ............... B29C 49/22 206/459.1 |
| 5,038,951 A | * | 8/1991 | Rizzardi | ............. B65D 51/285 215/256 |

(Continued)

OTHER PUBLICATIONS

Blankenbach, K., et al., "Smart Pharamaceutical Packaging with E-Paper Display for Improved Patient Compliance," SID 2018 Digest, pp. 271-274.

(Continued)

*Primary Examiner* — Hoi C Lau
(74) *Attorney, Agent, or Firm* — Harness, Dickey & Pierce, PLC

(57) ABSTRACT

A medication bottle includes an outer container wall, an inner container wall and a fluid, such as an aversive liquid, located between the walls. In another aspect, the fluid is located within separate compartments or channels located between the walls where the walls contact or are secured to each other. A further aspect provides a removeable cap including multiple sensors, at least one of which is a biometric sensor.

29 Claims, 12 Drawing Sheets

(51) Int. Cl.
 *B65D 50/00* (2006.01)
 *B65D 55/02* (2006.01)
 *G07C 9/25* (2020.01)

(56) References Cited

U.S. PATENT DOCUMENTS

| | | | | |
|---|---|---|---|---|
| 5,927,549 | A * | 7/1999 | Wood | B65D 51/285 222/83 |
| 6,045,254 | A * | 4/2000 | Inbar | A61J 9/00 366/130 |
| 6,412,526 | B2 * | 7/2002 | Castillo | B65D 51/28 141/100 |
| 7,002,476 | B2 | 2/2006 | Rapchak | |
| 7,142,699 | B2 | 11/2006 | Reisman et al. | |
| 7,337,921 | B2 * | 3/2008 | Ma | B65D 51/285 222/83.5 |
| 7,607,549 | B2 * | 10/2009 | Morini | B65D 41/3438 215/297 |
| 7,874,420 | B2 * | 1/2011 | Coon | B65D 81/3222 206/219 |
| 8,672,156 | B2 * | 3/2014 | Martinovic | B65D 51/28 215/253 |
| 9,126,731 | B2 * | 9/2015 | Chen | B65D 51/2835 |
| 9,522,770 | B2 * | 12/2016 | Pichrt | B65D 55/024 |
| 9,975,684 | B1 * | 5/2018 | Dvorak | B65D 51/2835 |
| 10,301,084 | B2 * | 5/2019 | Rosendaal | B65D 75/5883 |
| 10,380,321 | B2 | 8/2019 | Kamen et al. | |
| 10,402,827 | B2 | 9/2019 | Sheets et al. | |
| 10,404,754 | B2 | 9/2019 | Baghdasaryan et al. | |
| 10,597,207 | B2 * | 3/2020 | Seelhofer | B65D 51/2821 |
| 2004/0129729 | A1 * | 7/2004 | Thomson | B65D 49/04 222/153.06 |
| 2007/0017830 | A1 * | 1/2007 | Neumeyer | B65D 51/2835 206/219 |
| 2007/0043469 | A1 | 2/2007 | Draper | |
| 2007/0045134 | A1 * | 3/2007 | Dvorak | B65D 51/2835 206/222 |
| 2007/0074979 | A1 * | 4/2007 | Cho | B65D 51/1672 206/219 |
| 2007/0262042 | A1 * | 11/2007 | Pareja | B65D 49/04 215/17 |
| 2009/0090715 | A1 * | 4/2009 | Goldberg | B65D 17/4012 220/269 |
| 2009/0139882 | A1 * | 6/2009 | DeJonge | B65D 51/2892 206/219 |
| 2009/0139951 | A1 * | 6/2009 | Chen | B65D 51/2835 215/227 |
| 2011/0174642 | A1 * | 7/2011 | Coon | B65D 51/2835 206/222 |
| 2011/0278299 | A1 * | 11/2011 | Schueller | B65D 41/3428 220/288 |
| 2012/0168326 | A1 * | 7/2012 | Pannu | B65D 51/2835 206/219 |
| 2014/0114275 | A1 * | 4/2014 | Creaturo | A61J 1/2062 604/416 |
| 2014/0131302 | A1 * | 5/2014 | Maloney | B65D 41/265 215/257 |
| 2014/0166157 | A1 * | 6/2014 | Salinas | B65D 51/2835 141/329 |
| 2014/0224797 | A1 * | 8/2014 | Maloney | B65D 47/243 220/212 |
| 2014/0341411 | A1 * | 11/2014 | Mohindra | A61J 7/0436 381/334 |
| 2015/0112264 | A1 | 4/2015 | Kamen et al. | |
| 2015/0199547 | A1 * | 7/2015 | Fraccaroli | F41A 17/063 340/10.1 |
| 2015/0203273 | A1 * | 7/2015 | Gerard | B65D 81/32 426/1 |
| 2016/0251126 | A1 * | 9/2016 | Iwasaki | B29C 59/022 215/41 |
| 2016/0256357 | A1 | 9/2016 | Stein et al. | |
| 2016/0339461 | A1 * | 11/2016 | Kaplan | A61L 9/12 |
| 2017/0050774 | A1 * | 2/2017 | Giraud | B32B 27/08 |
| 2017/0124283 | A1 | 5/2017 | Cameron | |
| 2017/0246625 | A1 * | 8/2017 | Becker | C12Q 1/6806 |
| 2017/0251702 | A1 * | 9/2017 | Kramer | A23L 27/29 |
| 2017/0281467 | A1 | 10/2017 | Solotoff | |
| 2017/0305613 | A1 * | 10/2017 | Giraud | B65D 83/04 |
| 2017/0337347 | A1 | 11/2017 | Chu | |
| 2017/0355511 | A1 | 12/2017 | Akdogan et al. | |
| 2018/0046776 | A1 | 2/2018 | Chalifoux | |
| 2018/0068086 | A1 | 3/2018 | Hanson et al. | |
| 2018/0113993 | A1 | 4/2018 | Wiser et al. | |
| 2018/0165421 | A1 | 6/2018 | Hall et al. | |
| 2018/0273261 | A1 * | 9/2018 | Qiu | B65D 55/08 |
| 2020/0085686 | A1 * | 3/2020 | Aliakbarian | B65D 55/02 |

OTHER PUBLICATIONS

Pareek, V., et al., "Pharamaceutical Packaging: Current Trends and Future," International Journal of Pharmacy and Pharmaceutical Services, vol. 6, Issue 6, Jun. 6, 2014, 7 pages.

"Aptar Pharma's Electronic Lockout Device Approved by EMA," Aptargroup, news.aptar.com, May 15, 2017, 2 pages.

"MedMinder Pill Dispenser's Features at a glance," www.MedMinder.com, believed to have been published prior to Sep. 2018, 2 pages.

Areas-Holmblad, L., "Technologies to prevent drug diversion gain traction amidst opiod crisis," www.drugaddctionnow.com, Jan. 16, 2017, 5 pages.

* cited by examiner

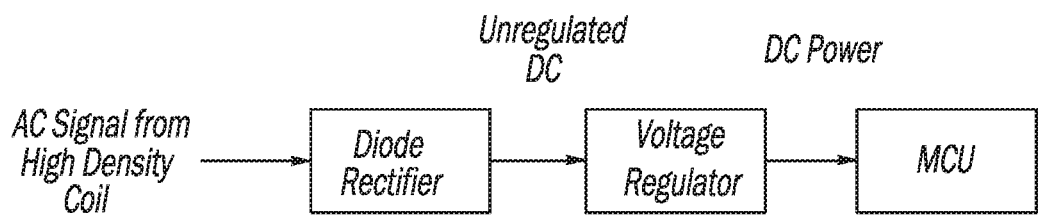
FIG - 3
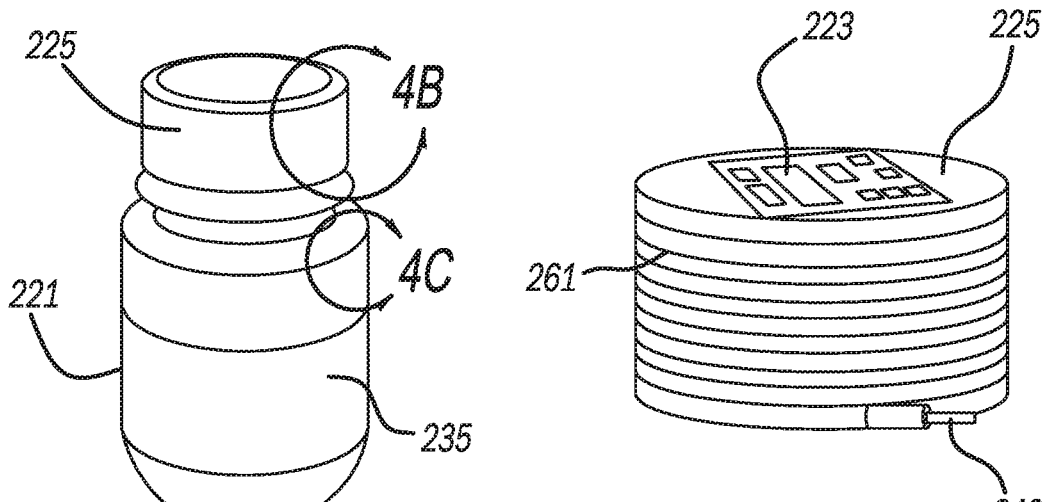
FIG - 4A
FIG - 4B
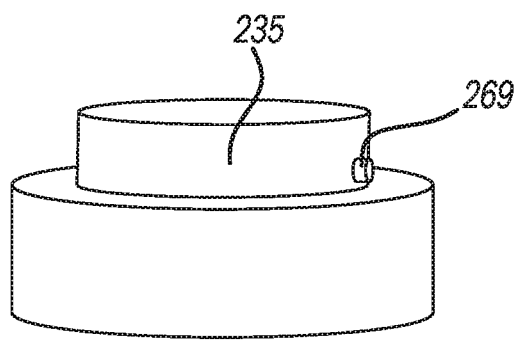
FIG - 4C

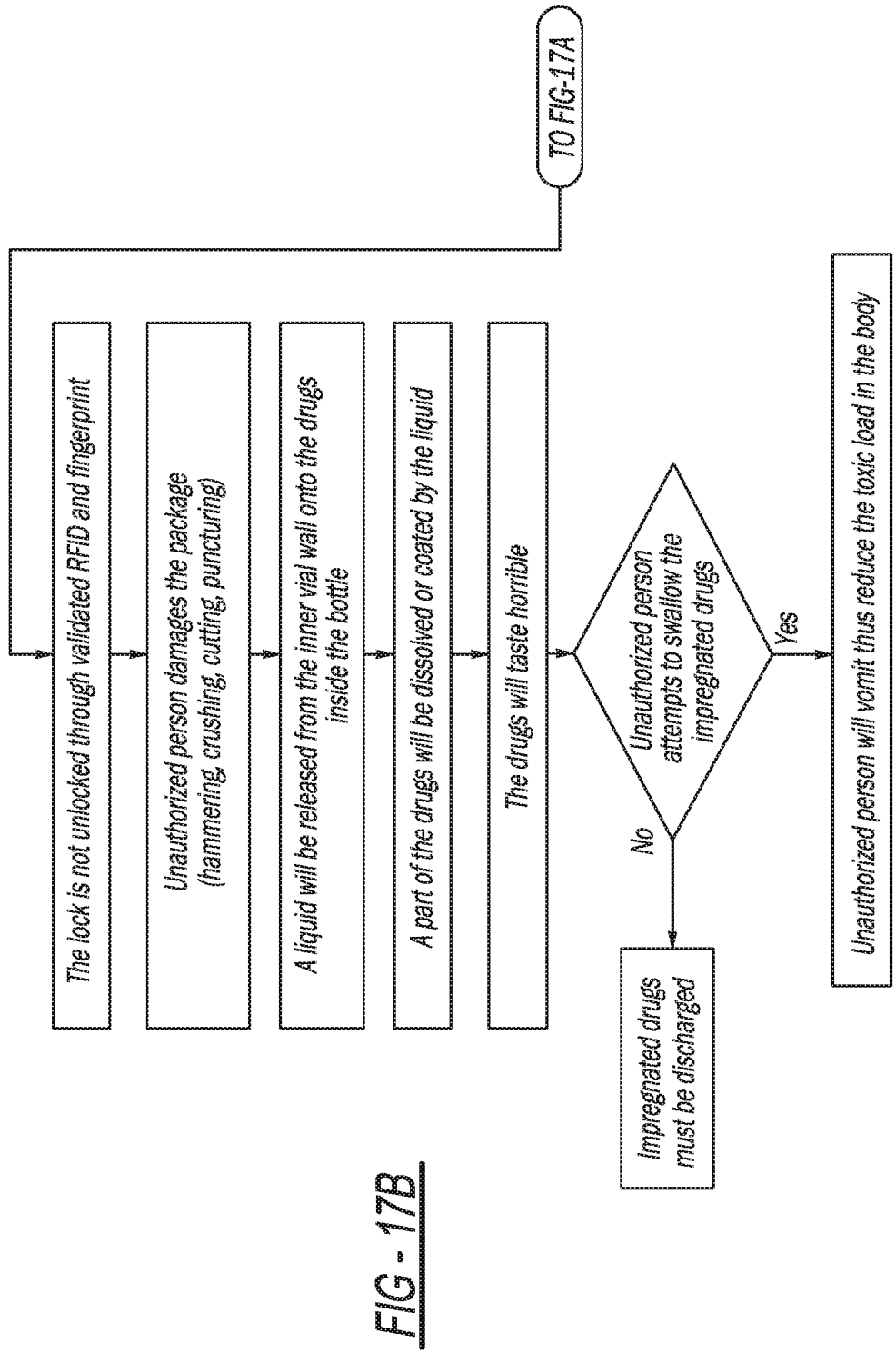

MEDICATION BOTTLE WITH ANTI-TAMPERING FEATURES

CROSS-REFERENCE TO RELATED APPLICATIONS

This application claims the benefit of U.S. Provisional Patent Application No. 62/731,263, filed Sep. 14, 2018. The entire disclosure of the above application is incorporated by reference herein.

FIELD

The present disclosure relates to anti-tampering features for medication bottles.

BACKGROUND AND SUMMARY

Current smart packaging safeguards for pills, such as locking caps and tamper-evident packages, help deter children and the elderly against unintentional drug abuse. Such existing packaging had limited success against intentional drug abuse; taking someone else's prescription, even if for a legitimate medical complaint, such as pain or taking a medication to feel euphoria. As indicated in 2016 National Survey on Drug Use and Health, 50 percent of prescription opioid users got their last painkillers from a friend or relative, with 40.4 percent paying nothing for the pills.

To improve the tamper-evident packaging safeguard, a new generation of active packaging technology features an aversive effect of a non-toxic compound with a disgusting taste. The idea is that breaking open the existing tamper-evident pill bottle (e.g., by crushing or cutting it), will release the aversive compound onto the opioid pills, giving them a nauseating taste and vomiting effect. The central hypothesis is that giving opioid pills from a broken package a horrible taste with a non-toxic natural compound (e.g., denatonium benzoate) will decrease overdose risk.

In accordance with the present invention, a medication bottle includes an outer vial or container wall, an inner vial or container wall and a fluid, such as an aversive liquid, located between the walls. In another aspect, the fluid is located within separate compartments or channels located between the walls where the walls contact or are secured to each other. A further aspect provides a removeable cap including multiple user authentication sensors, at least one of which is a biometric sensor.

The present medication bottle is advantageous over traditional constructions. For example, the fluid of the present bottle changes a characteristic (such as taste, smell or function) of medication within the bottle in a tampered condition, thereby rendering it undesirable to use. In other words, the medication is thereby contaminated. Furthermore, use of multiple separated compartments or channels to hold the fluid in a nominal (i.e., untampered) condition, reduces the ability to externally drain the fluid without medication contamination. Moreover, at least two step authentication via user-biometric and/or with device based (e.g., RFID or password code) sensing, circuitry and software, creates cap-to-container temper-resistant protection. Additional features and advantages of the present bottle can be ascertained from the following description and associated claims as well as from the appended figures.

BRIEF DESCRIPTION OF THE DRAWINGS

FIG. 3 is a circuit block diagram showing the third embodiment of the present medication bottle;

FIG. 4A is a perspective view showing the third embodiment of the present medication bottle;

FIG. 4B is an enlarged and perspective, diagrammatic view, taken within circle 4B of FIG. 4A, showing the third embodiment of the present medication bottle;

FIG. 4C is a fragmentary and enlarged, perspective view, taken within circle 4C of FIG. 4A, showing the third embodiment of the present medication bottle;

FIGS. 16 and 17A-B are software logic flow diagrams employed with the third, fourth or fifth embodiments of the present medication bottle.

DETAILED DESCRIPTION

Example embodiments will now be described more fully with reference to the accompanying drawings.

Figure 1A:
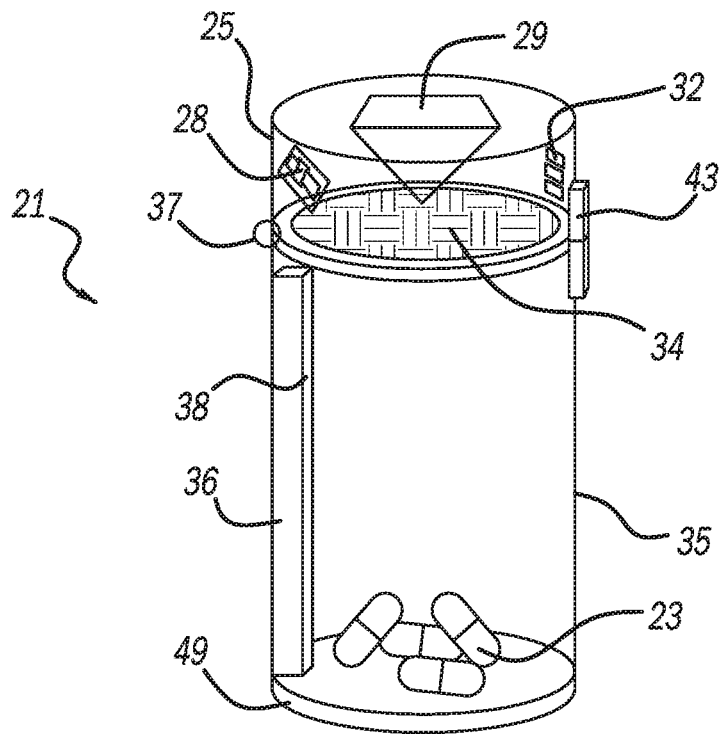
FIG. 1A is a diagrammatic perspective view showing a first embodiment of the present medication bottle.
Figure 1B:
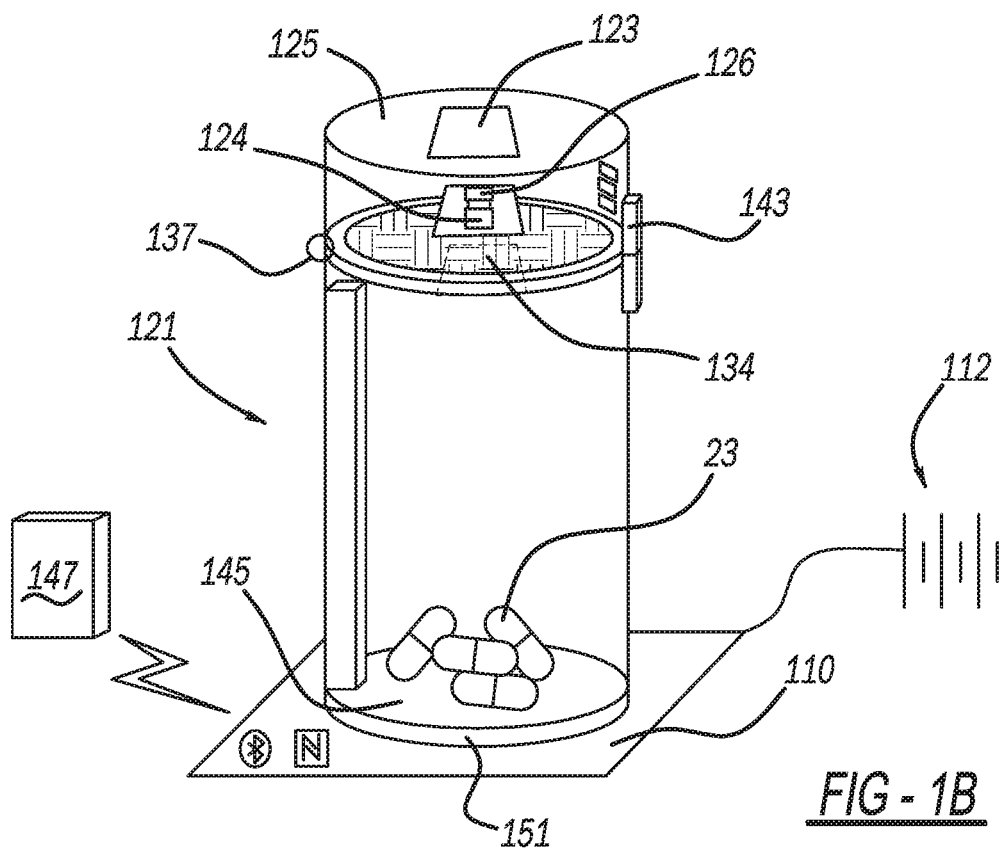
FIG. 1B is a diagrammatic perspective view showing a second embodiment of the present medication bottle.
Figure 1C:
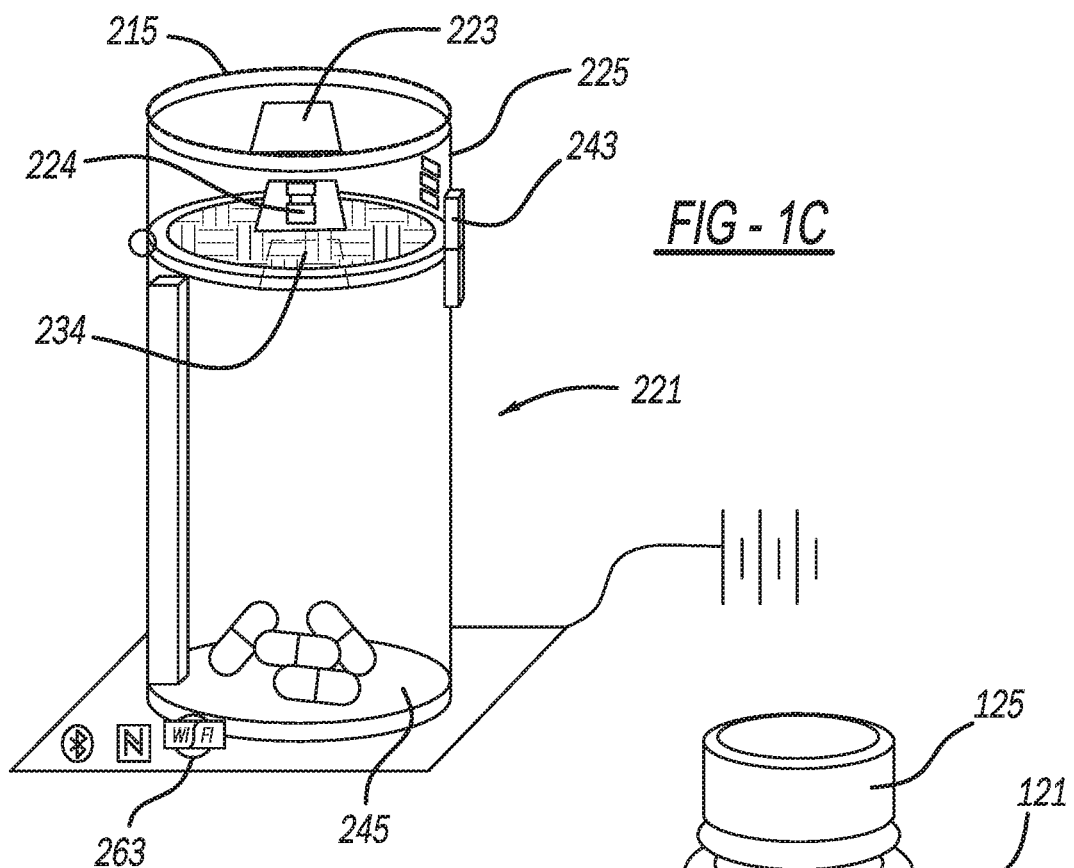
FIG. 1C is a diagrammatic perspective view showing a third embodiment of the present medication bottle.

Three variants are shown in FIGS. 1A, 1B, and 1C of smart bottles 21 for prescription solid formulations of medication 23 in the form of tablet pills or gel capsules 23. The bottle models of FIG. 1A through 1C are equipped with increasingly more smart features (sensors and software). The integration of smart features will: 1) allow only authorized patients access to their pills (only) at the right time and at the correct dosage; and 2) allow the prescriber and pharmacist to observe data generated by these sensors to remotely monitor product removal and help support pain management.

Bottle 21 of FIG. 1A secures a bottle-cap 25 with fingerprint recognition technology using a single RGB camera 28 equipped with a standard CMOS sensor through which the colored images of persons and objects are acquired. A Frustrated Total Internal Reflection (FTIR) finger print image is captured by the user placing his or her finger on a right angle prism 29. The fingerprint is illuminated using an array of white light LEDs 32. Fingerprint recognition is performed using an on-board microprocessor 34. A container body 35 of the bottle is secured against physical tampering by integrating a dual-walled layer including a water solution of aversive compound 36. A compartment vial 38 of container body 35, between the dual walls will release the aversive compound on pills 23 inside bottle 21 upon tampering with the bottle, which will render the pills unconsumable. Bottle-cap 25 is attached to the bottle body 35 using a hinge 37 and a biometric controlled locking mechanism 43. The on-board microprocessor is powered using a non-rechargeable battery 49 in container body 35 on cap 25.

A second embodiment bottle 121 of FIG. 1B replaces the right-angle glass prism in FIG. 1A with a thin glass sheet 123. Bottle 121 of FIG. 1B comes equipped with a dual camera 124 and 126 setup mounted back-to-back to each other. Camera 124 is pointing upwards to capture a direct view 126 is fingerprint image of the finger placed on thin glass sheet 123 mounted on a removable cap 125. Camera 126 is pointing downward to image contents of a container 135 of bottle 121, which is then processed to count the number of pills 23 in the bottle. A hinge 137 and locking mechanism 143 of the FIG. 1B embodiment are also equipped with weight sensors 145 for measuring the weight in the bottle (discussed in greater detail hereinafter with regard to FIG. 6), which augment the pill counting mechanism based on the image captured by camera 126. The bottle comes equipped with Bluetooth and NFC technologies, which it uses to pair with any smartphone device 147 for utilizing its computing resources for analyzing the bottle's usage statistics.

Figure 2A:
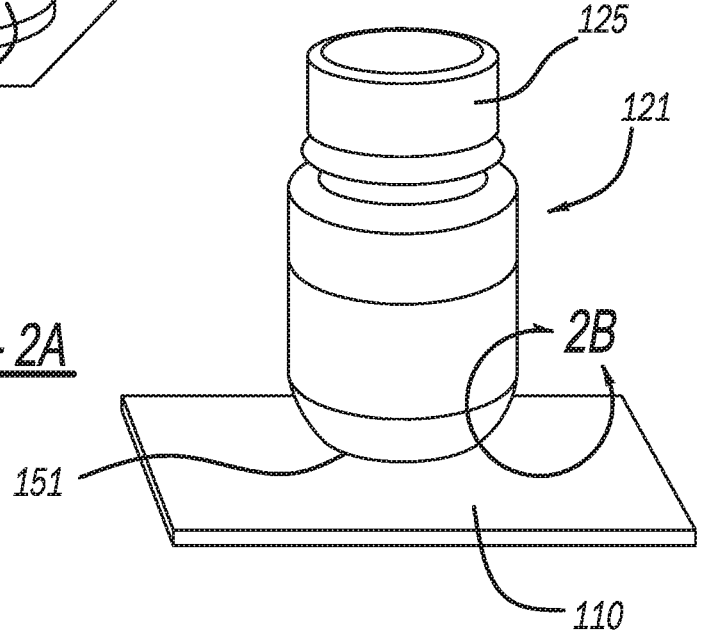
FIG. 2A is a perspective view showing the third embodiment of the present medication bottle.
Figure 2B:
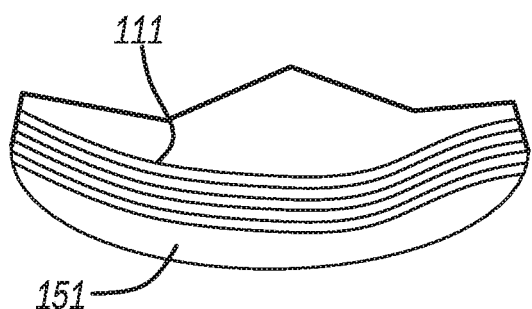
FIG. 2B is a fragmentary and enlarged diagrammatic view, taken within circle 2B of FIG. 2A, showing the third embodiment of the present medication bottle.

Unlike the version of FIG. 1A, the present exemplary FIG. 1B bottle uses a wireless charging pad 110 for powering its on-board microprocessor 134. The wireless charging pad can further draw power from a power supply 112, such as a wall socket or a portable battery bank. A base or bottom 151 of the bottle is equipped with a compatible wireless charging coil 111 as shown in FIG. 2B.

The sensing and computation procedure requires DC power, which is usually obtained from batteries. However, use of a battery would make the pill bottle bulky in size and impose a recurring cost. Hence, an RF power harvesting mechanism, such as coil 111, is implemented at the bottom part of the pill bottle, preferably as a high-density coil. A detailed block diagram is shown in FIG. 3 for the wireless charging and the energy harvesting. Bottom coil 111 receives the AC signal with mutual coupling of the coil. The signal is rectified in the diode rectifier bank to convert AC into DC power. However, the generated DC is unregulated and needs a voltage regulator for a regulated supply. Once the regulated power is generated, it can power up the processing unit, the MCU and other sensors.

Figure 9:
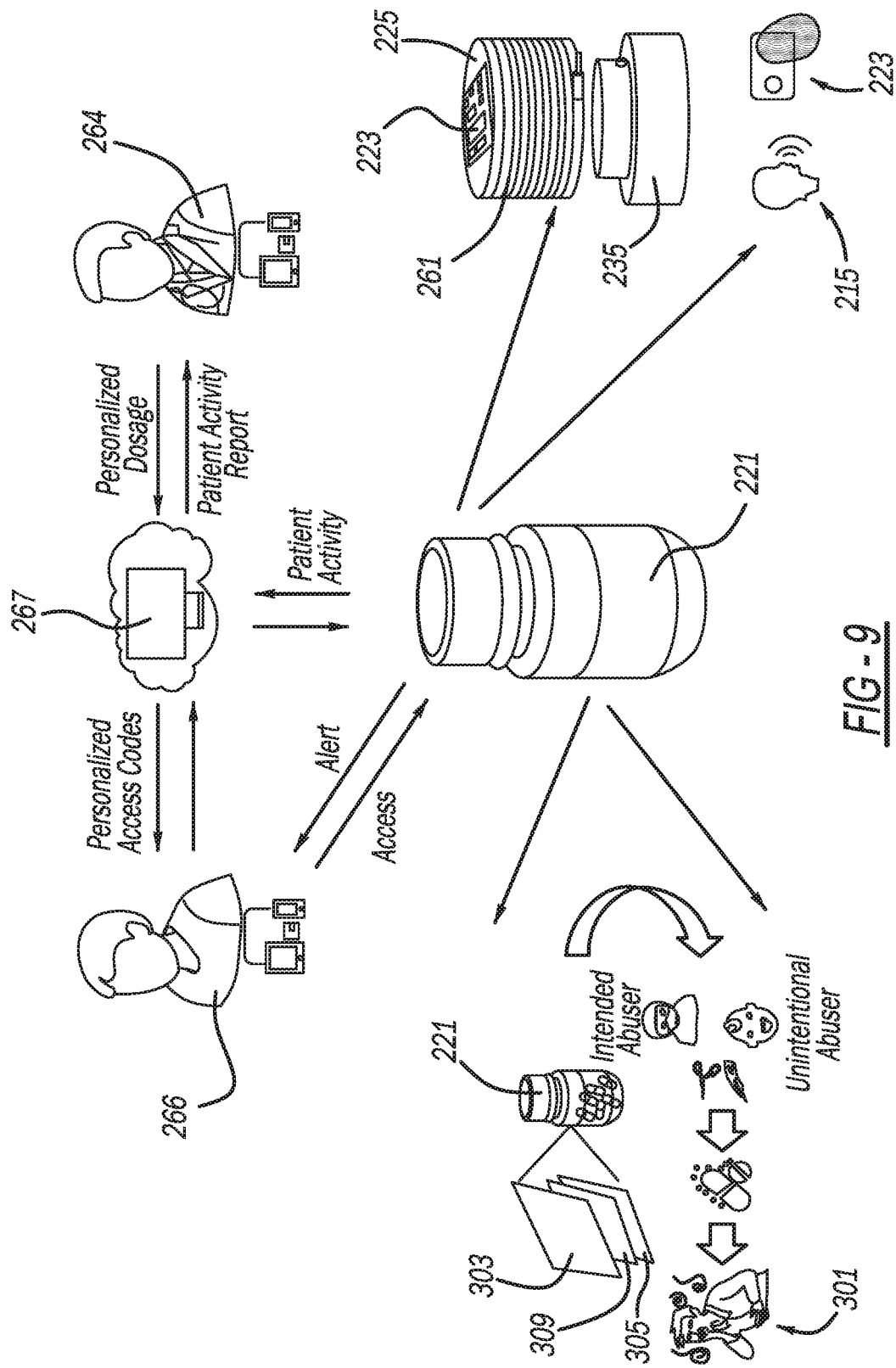
FIG. 9 is a diagrammatic illustration showing the third embodiment of the present medication bottle and its uses.

Referring to FIG. 1C, a software-enabled bottle 221 contains multiple sensors namely: an RFID sensor 261 (see FIG. 4B), an optical sensor using a camera 224 and a weight measurement sensor 245. The model of FIG. 1C has all the features of the model of FIGS. 1 and 9B. The FIG. 1C bottles 221, however, are additionally equipped with Wi-Fi technology, including a transmitter and receiver 263 mounted to the bottle, and can connect to the internet. Therefore, the bottles can be remotely monitored and controlled by healthcare professionals or caregivers 264 via a monitor station 267. Also, this bottle 221 comes equipped with a circular array of far-field microphones and a speaker unit 215 mounted on top of the bottle cap 225. Microphone-speaker unit 215 is used to operate a voice based digital assistant on the bottle itself. The digital assistant can assist a user 226 with correct usage of the bottle and can provide an additional layer of biometric security using voice recognition technology.

Figure 5:
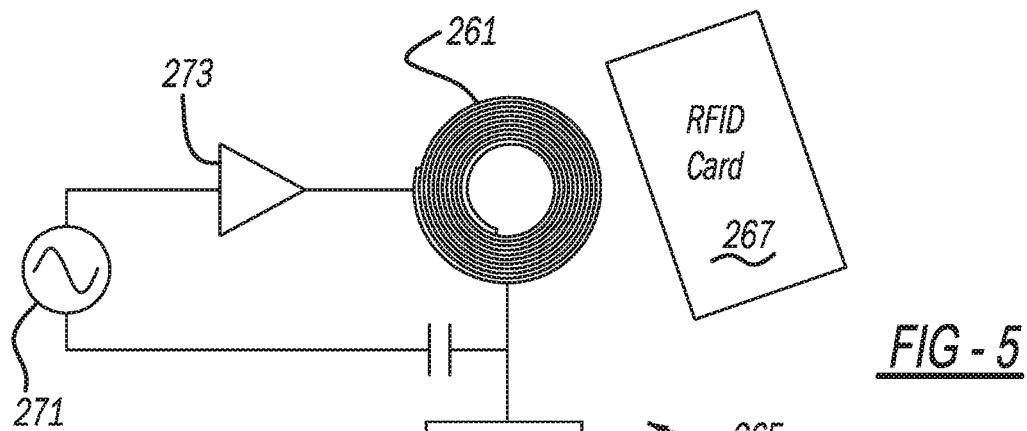
FIG. 5 is a circuit diagram showing an RFID circuit employed in the third embodiment of the present medication bottle.

RFID sensors 261 are mounted to cap 225. Furthermore, an electrical circuit 265 of a lockout mechanism 243 with a processing unit 234 is shown in FIG. 5. The processing unit is responsible for obtaining necessary information from the sensors and activates lock 243 upon authorization. The lock out is an electromagnetic lock mechanism 243 having a small size and an electronic control.

The basic block diagram of the RFID sensor is shown in FIG. 5. The sensing unit consists of two parts: 1) an RFID reader 265, and 2) an RFID card 267. The RFID card has the ID, which is read by the reader. Reader 265 is installed on top of cap 225 of the pill bottle along with a processing unit 234. The bottle verifies each user with a valid RFID 267 card and provides acknowledgement signal to processing unit 234 for opening a push-pull lock 343 (see FIG. 4B) which is operably received in a hole 269 (see FIG. 4C) in an outer wall of container 235 at an optional reduced diameter neck. The reader has a RF oscillator 271, which generates the RFID frequency. The low power RF signal is amplified by a power amplifier 273 and transmitting coil 261 is excited. To miniaturize the system, the transmitting coil is designed around cap 225. If an RFID card is present within the electromagnetic field, a perturbation is observed, which is compared at a comparator 275 with a reference voltage 277. The sequence of ID is read and sent to microcontroller unit (MCU) 234.

Figure 6:
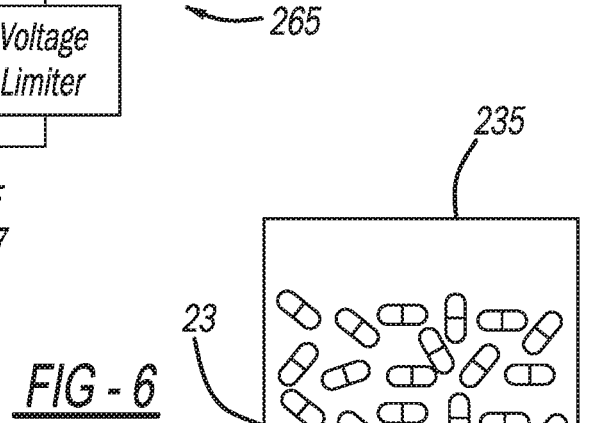
FIG. 6 is a diagrammatic side view showing an optional weighing feature employed in any of the embodiments of the present medication bottle.
Figure 7:
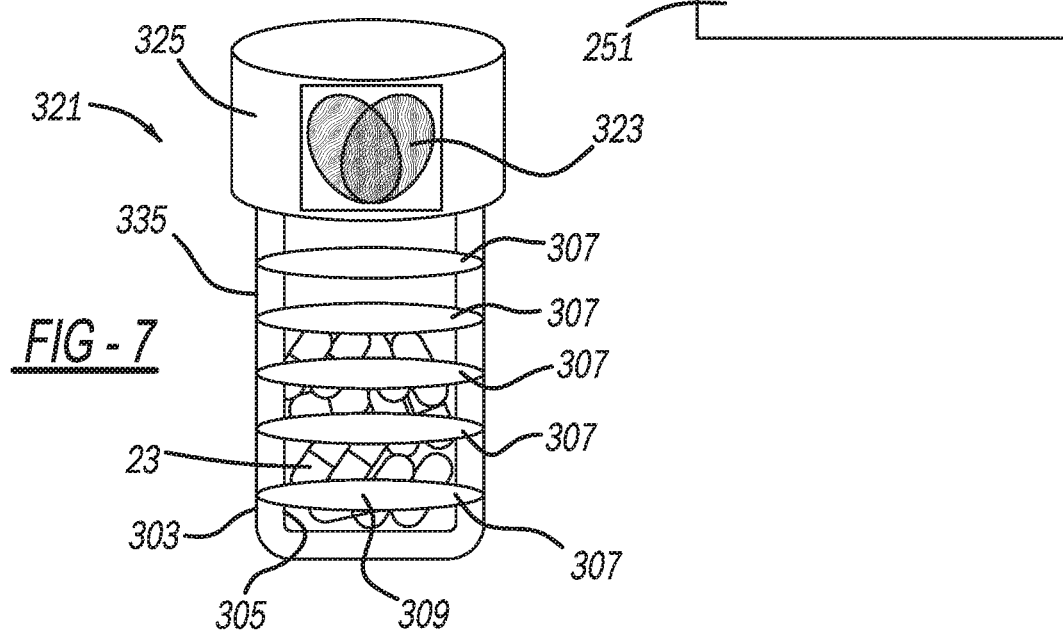
FIG. 7 is a diagrammatic perspective view showing a fourth embodiment of the present medication bottle.

Also a weight sensor 145 is implemented as shown in FIG. 6 to estimate how many pills 23 are dispensed and/or to prevent drug abuse. For this, a piezo resistive based thin film is inserted in between pill container 235 and a pill bottle bottom 251. The piezo film changes the RFID sensor circuit architecture based on its resistance according to pressure applied on it. From the resistance of piezo film 145, an estimate of the number of pills 23 is obtained. The resistance is measured by processing unit 234.

Reference should now be made to FIGS. 7, 8A-F and 9 to understand the anti-tampering features of the present bottle 321. The present embodiment of this bottle device 121 combines RFID sensor, biometric authentication sensors, and a lockout mechanism that secures prescribed drugs 23 and prevents unauthorized individuals 301 from accessing them. This smart pill device prevents young children and adolescents from accessing pills found at home. To make it able to divert force—induced package-tampering, a novel dual-walled 303 and 305 vial packaging design with an embedded channel 307 contains an aversive liquid 309 between its walls. This vial can be handled, filled, and closed—as are standard vials. The inner container wall 305 will have channels 307, effectively creating compartments, that when assembled hold aversive liquids 309 even if multiple locations on outer walls 303 have been punctured. The dual-wall vial or container 335 with distinct low-impact resistant inner and impact resistant outer polymer-based layers will function if the outer walls are punctured at multiple sites, thus, making it less susceptible to drainage. This design will harden the package to prevent casual tampering and it will prevent force-induced tampering.

The aversive liquid includes a non-toxic compound with repellent taste, such as naltrexone, for use as an abuse deterrent compound. The pill package can be used to prevent intentional abuse of prescription drugs, theft and diversion, and associated overdose death. A water solution containing the aversive formulation will be released onto pills 23 thereby dissolving them and rendering them repellent only in the case of manipulation of the drug package by cutting, puncturing, or crushing. As a result, the present configuration will render impossible, the misuse of bottle 321 by force or puncture or other tampering methods.

Bottle 321 incorporates a dual-wall vial or container 335 with channels 307. As previously mentioned, the channels between the outer and inner layers 303 and 305 respectively are filled with aversive compound 309. The bottle will seal the liquid within the dual-walled container body and provide the threaded area to which the soon-to-be-completed, container cap 325 will be affixed. Inner vial chamber or wall 305 is fabricated with a polymer that can be easily broken by smashing, puncturing, or cutting (See FIGS. 8E and 8F). Polystyrene (PS) is preferred for inner wall 305 since it is a low-cost and brittle plastic (Izod impact strength=1.6 kJ/m$^2$). Outer vial body or wall 305 is made of a polymer with excellent mechanical properties and good impact resistance, such as polypropylene (PP) or high-density polyethylene (HDPE). These two polymers are inexpensive, and they have good impact strengths (PP and HDPE have impact strengths of 8.8 and 16.7 kJ/m$^2$, respectively.)

Figure 8:
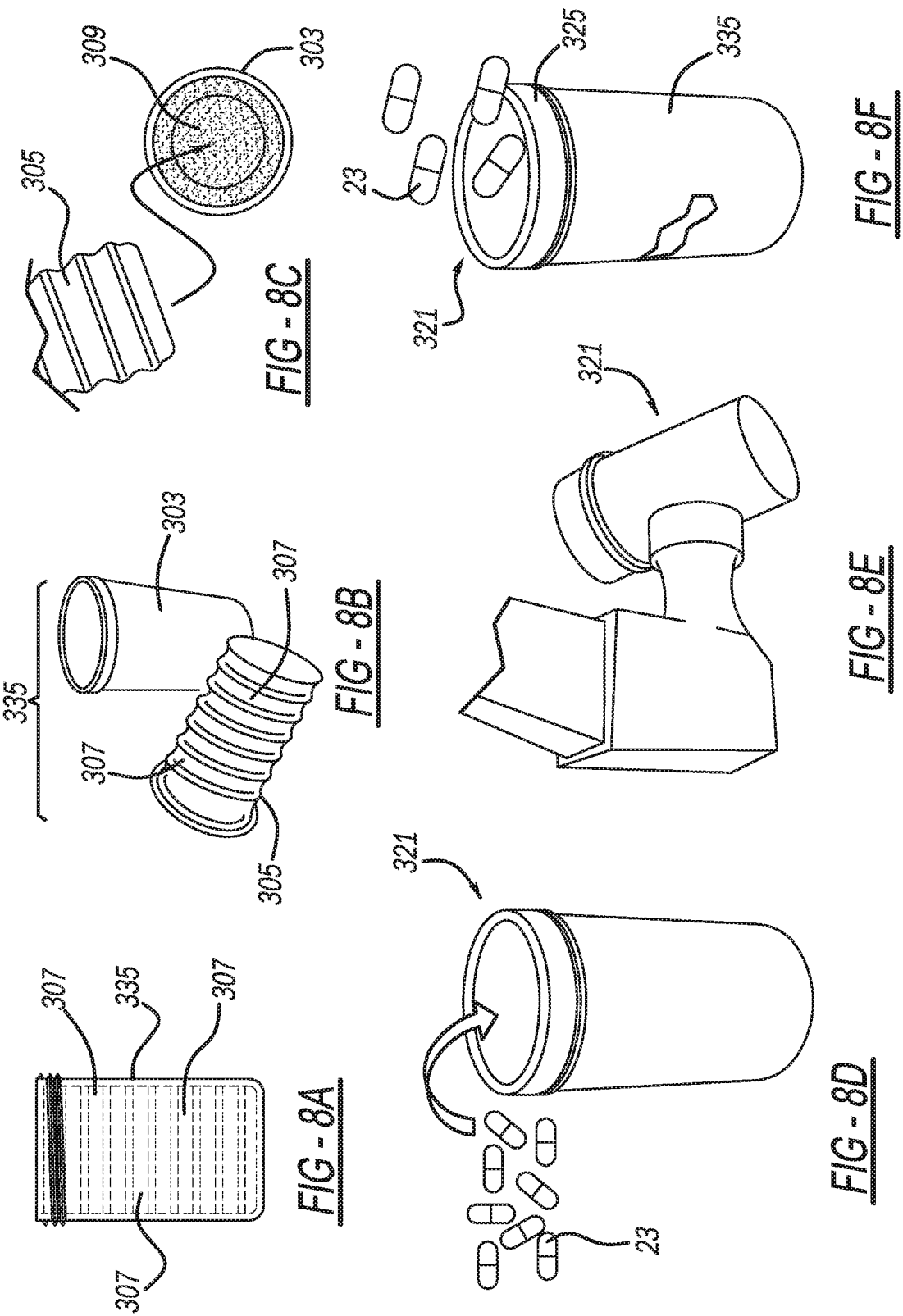
FIGS. 8A-F are a series of views showing manufacturing and testing steps for any of the embodiments of the present medication bottle.

3D printing may be used to create a prototype of the dual walled vial. It offers precise control over the containers' desired features. As shown in FIG. 8A-B, inner container wall 305 has channels 307. This effectively creates compartments, that when assembled, will hold the aversive liquids even if outer wall 303 is punctured at multiple sites. This makes the outer wall less susceptible to drainage. The prototype inner container is 3D printed using acrylonitrile-butadiene-styrene (ABS)-P430 Model as a printing material. An aversive liquid 309 is added within outer vial wall 303 and then inner vial wall 305 is inserted therein as shown in FIG. 8C. The two container vials or walls are sealed with Loctite Super Glue Ultragel Control or a thin urethane coating. Then pills 23, such as opioid tablets, are placed in the container, and the container is closed before hammering. For testing, the container is hammered until it is broken (See FIG. 8E). The pills after undergoing a hammering test are contaminated with the liquid (See FIG. 8F).

In production, a more brittle inner cup or wall relative to the outer cup or wall, that can break more easily maybe desired. For this purpose, polylactic acid (PLA), which is a bio-based plastic (impact strength=~4-6 kJ/m$^2$) is known for its brittle qualities which can be used as the material for the inner cup formation (via a 3D printer) while the outer container may be made of impact-resistance ABS copolymer (impact strength=~11-18 kJ/m$^2$). This combination of brittle inner cup and the exterior impact resistant cups will facilitate selective breakage of the inner cup. In turn, this will facilitate the drainage of the aversive liquid into the inner cup to contaminate the pills.

Three different categories of aversive compounds 309 may be used as summarized in Table 1.

TABLE 1

Compounds for use as abuse deterrents

|  | Compound | Sites of action | Concentration (μM) |
|---|---|---|---|
| Emetics | Emetine | Gastric mucosa Chemoreceptor trigger zone | 0.1-10 |
|  | Cephaeline | Gastric mucosa Chemoreceptor trigger zone | 10-100 |
|  | Rimonabant | Chemoreceptor trigger zone | 0.01-10 |
|  | Naltrexone | Chemoreceptor trigger zone | 0.1-1.0 |
| Pungent drugs | Capsaicin | TRPV1 receptors | 10-300 |
|  | Allyl isothiocyanate | TRPA1 receptors | 100-1000 |
|  | Quinine | T2R4 receptors | 50-1000 |
| Gastric irritants | Copper sulfate | Gastric mucosa | 200-5000 |

Reference should now be made to FIGS. 10-15. A fifth embodiment of the present medication bottle 425 employs three main strategies to reduce the likelihood of undesired tampering or misuse: RFID technology, two-factor authentication, and the release of an aversive compound. Biometric authentication methods not only eliminate passwords, they save time wasted in failed password attempts and password reset procedures. Biometric authentication is used as an efficient and secure approach to increase the prescription drug safety by personalizing the access to the drug package to reduce the intentional and unintentional abuse of drugs. Furthermore, inherent characteristics (e.g., fingerprints, face recognition pattern, voice recognition), through a smart phone, is used as a second level of the authentication. The combination of RFID tags and two-factor authentication allows the recovery of information online for the caregiver who can also receive immediate email or text message notifications, and weekly reports. In this way, the caregiver can easily program the package and customize preferences remotely via the internet. The software provides reports regarding the medication activity such as when drugs were taken, and when they are refilled, and if any medications were missing.

RFID tags connected to a software application on the smart phone allows reading of RFID tags on packages, enabling real-time tracking of drugs, as well as communication and intervention by healthcare providers. In this way, prescribers could obtain information on individuals' prescription drug use and allow pharmacists and law enforcement to follow the prescribing behavior of health professionals. For example, if a prescriber finds, after examining data, that a patient has many new prescriptions for commonly misused prescription drugs (e.g., opioids, tranquilizers, sedatives, and stimulants), then he or she can make an informed decision about whether or not to provide that patient with another prescription and/or to screen for potential substance abuse disorder.

A cap 425 has an upper section 481 and a lower section 483, which are preferably integrally injection molded or three-dimensionally printed together as a single piece, with a removable, horizontally oriented plug 484 located within a hollow internal cavity thereof. Lower section 483 has an openly accessible bottom 485 bordered by a circular-cylindrical side wall 486 with an internal helical thread 487 formed therein.

Various electronic components are attached within upper section 481 of cap 425. These components include fingerprint scanning sensor 423, a radio frequency identification (RFID) reading sensor 488 and a printed circuit board 489 upon which is mounted a microprocessor 434 and an electrically connected memory chip 490. A USB port 491, microprocessor 265 and associated electrical circuits are located on RFID sensing chip 488. Similarly, fingerprint scanner 423 also includes a microprocessor and electrical circuit mounted on its printed circuit board 492. All of these electronic components are securely mounted within the polymeric cap 425 with an uppermost surface of fingerprint scanner 423 and the open end of port 491 being externally accessible through apertures in the associated cap surfaces. A battery power supply or RF power source (See FIGS. 2A and 2B) are electrically coupled to printed circuit board 489.

Furthermore, a cap-to-container lock 443 includes an electromagnetic actuator 493, preferably a solenoid having a movable plunger or armature rod 343 with a coil winding. In a nominal condition after cap 425 is screwed onto container 435, with the medication 23 therein, rod 343 is nominally extended downwardly (or alternately, inwardly toward a rotational centerline if the solenoid is differently oriented). In this condition, the rod abuts against or is received within a slot or hole in an optional reduced diameter neck 494 of container 435 which serves to prevent unscrewing of the cap therefrom. Optionally, a magnetic receiver may be mounted to the neck 494 to magnetically secure rod 343 when extended. Moreover, when the two-factor biometric plus physical device-based authentication has been verified by the sensors and software, then microprocessor 434 causes actuator 493 to retract rod 343 in an upward and/or outward direction released from the slot or hole in the container thereby allowing unscrewing of cap 425 from bottle 435.

The device-based sensing may employ the RFID sensing and/or a manual push button code entry. It should alternately be appreciated that multiple biometric sensing such as fingerprint plus voice recognition, fingerprint plus camera imaging facial recognition, voice recognition plus camera imaging facial recognition, or any other combination thereof, may be employed instead of or in addition to the device-based contact methods.

Figure 16:
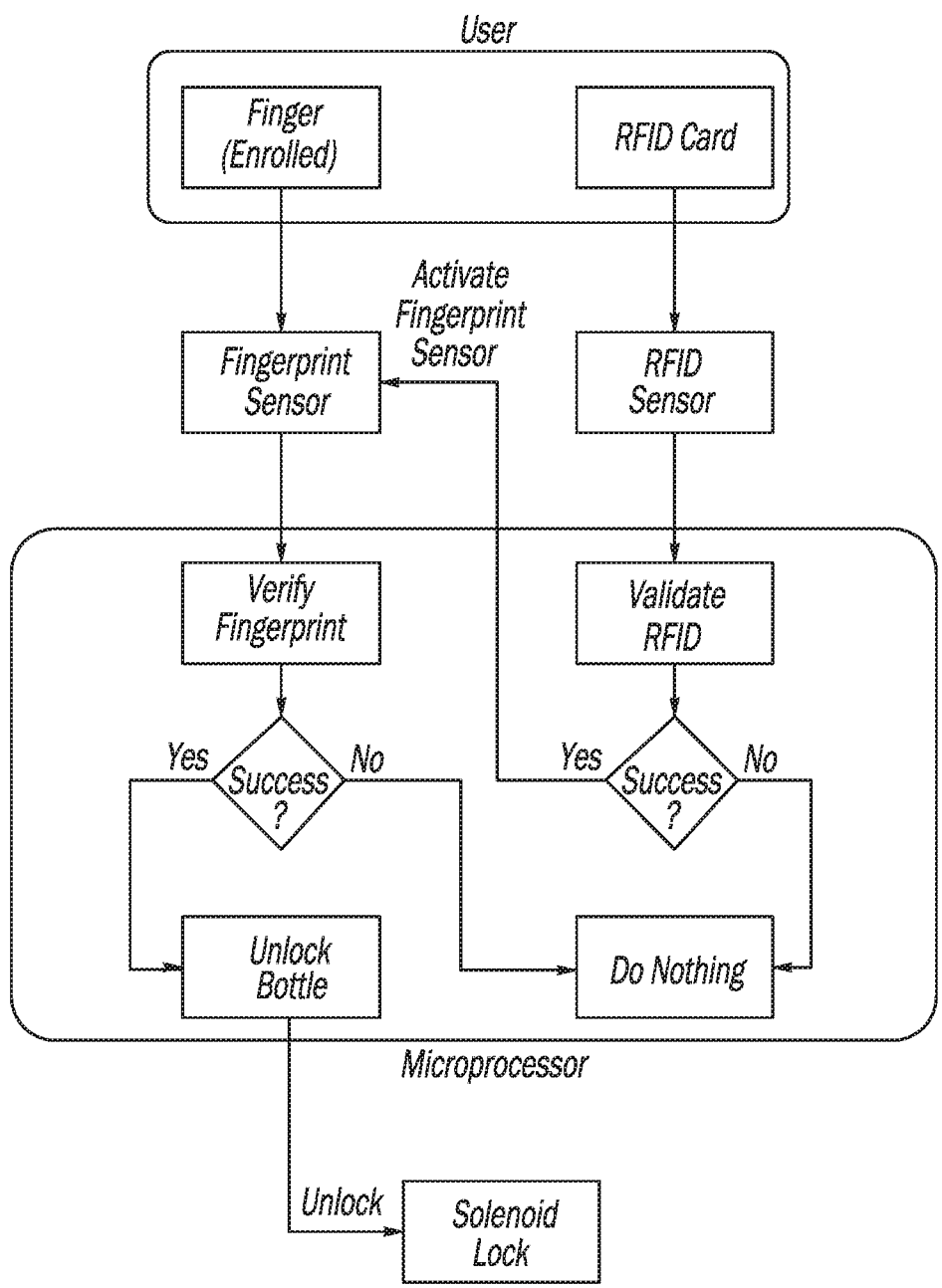
Figure 17A:
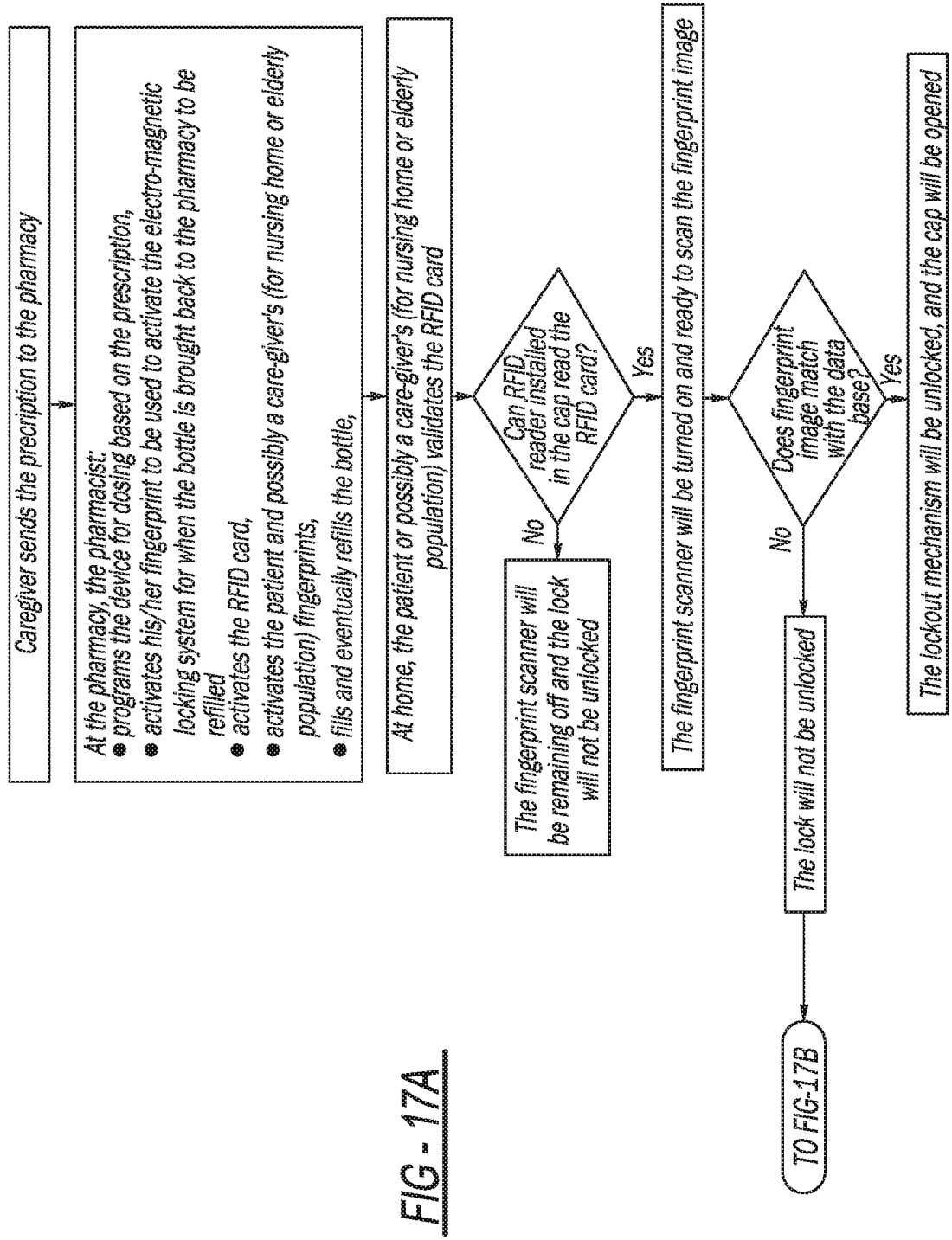

Software instructions programmed and stored into memory 480 and operated by microprocessor 434, are illustrated in FIGS. 16, 17A and 17B. Examples of biometric sensing and software are disclosed in the following U.S. Pat. No. 7,142,699 entitled "Fingerprint Matching Using Ridge Feature Maps" which issued to Reisman and Ross on Nov. 28, 2006; U.S. Pat. No. 10,380,321 entitled "System, Method and Apparatus for Electronic Patient Care" which issued to Kamen et al. on Aug. 13, 2019; U.S. Pat. No. 10,402,827 entitled "Biometrics Transaction Processing" which issued to Sheets et al. on Sep. 3, 2019; and U.S. Pat. No. 10,404,754 entitled "Query System and Method to Determine Authentication Capabilities" which issued to Baghdasaryan et al. on Sep. 3, 2019. All of these patents are incorporated by reference herein.

Figure 10:
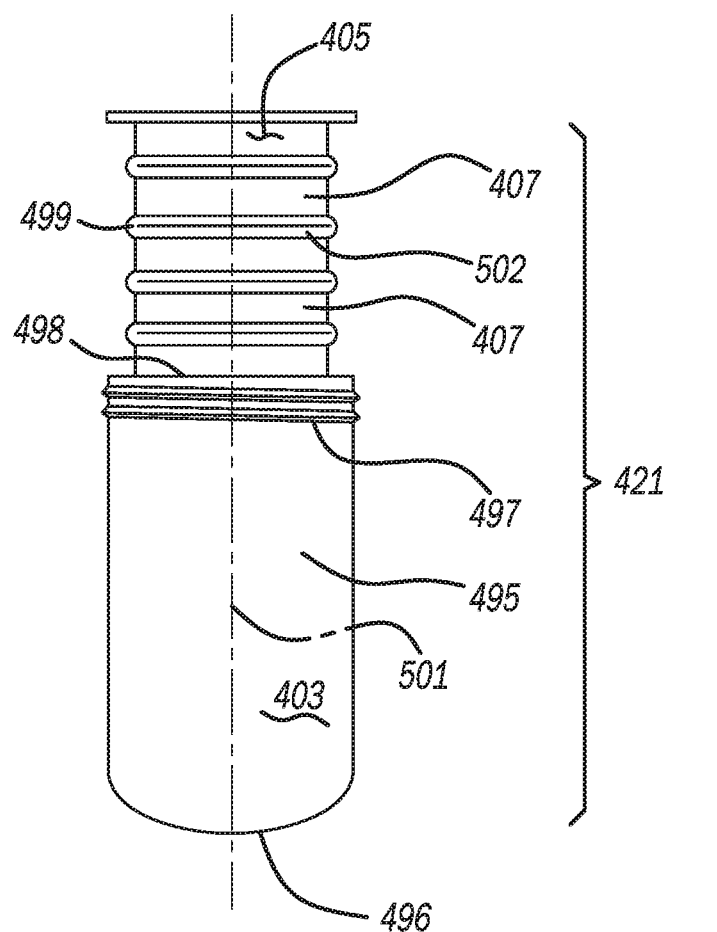
FIG. 10 is a partially exploded side elevational view showing the third embodiment of the present medication bottle.
Figure 11:
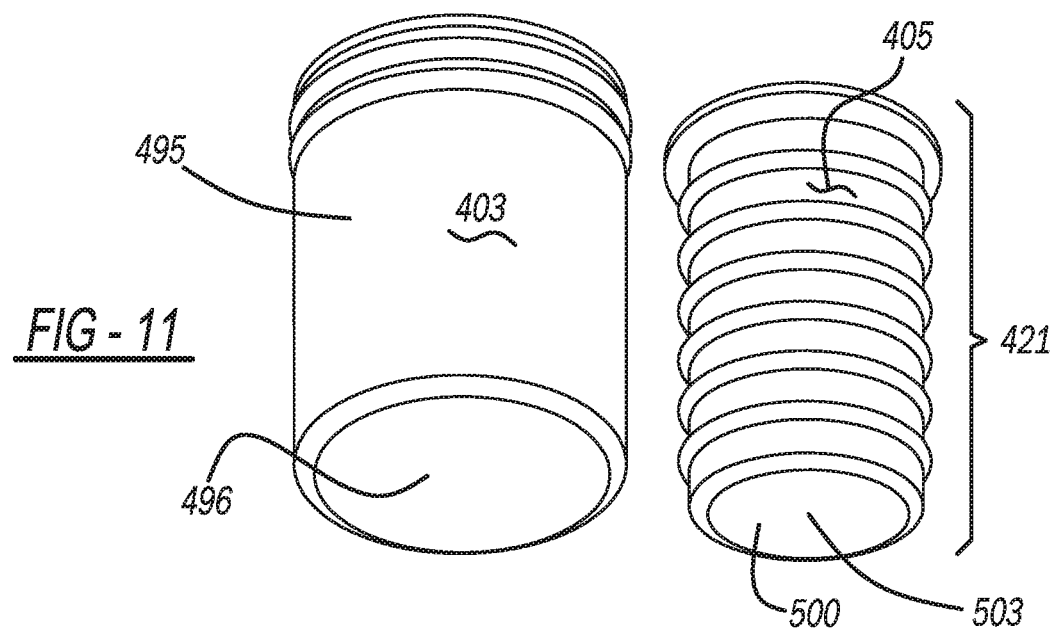
FIG. 11 is a bottom perspective view showing the third embodiment of the present medication bottle, in a disassembled state.
Figure 12:
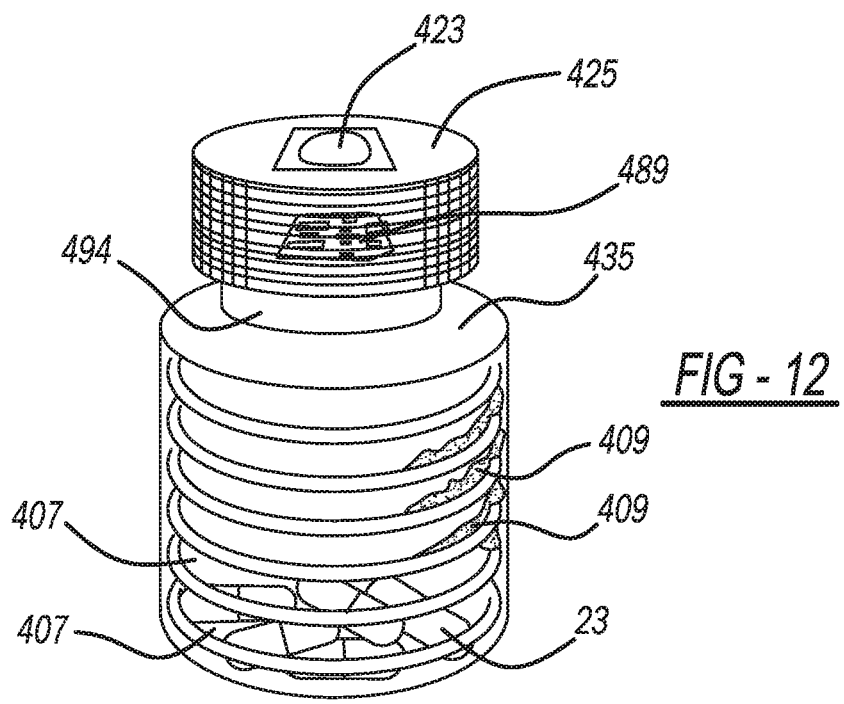
FIG. 12 is a diagrammatic perspective view showing a fifth embodiment of the present medication bottle.
Figure 13:
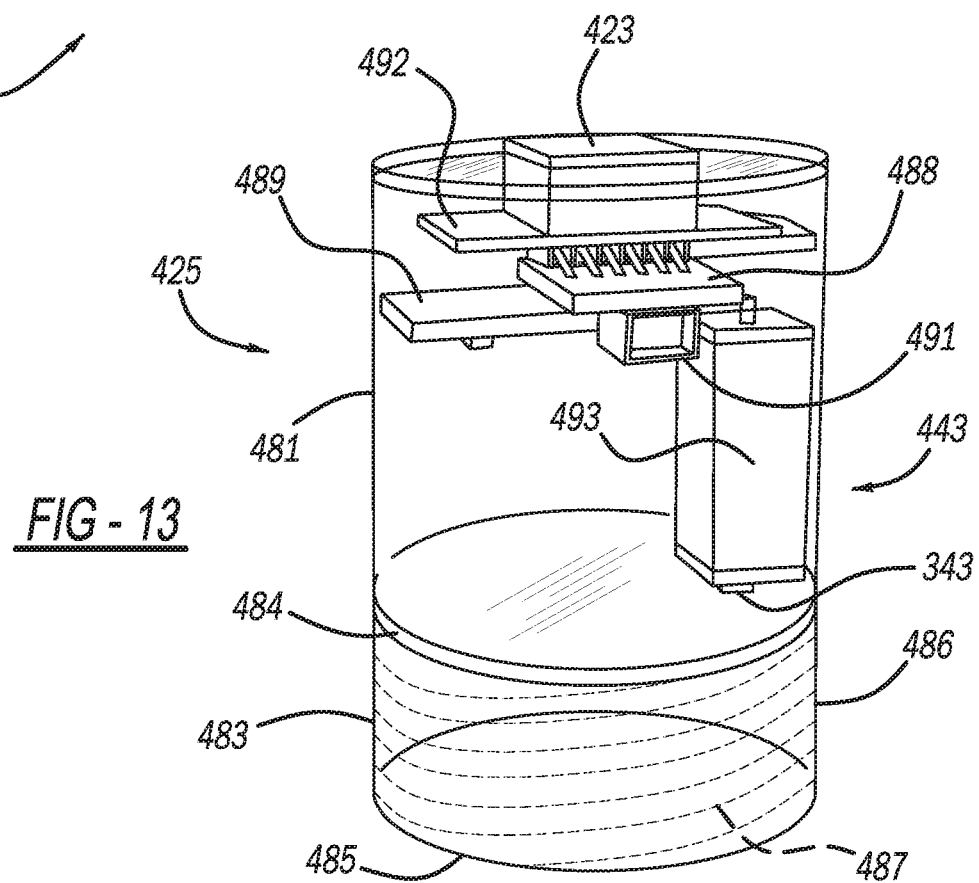
FIG. 13 is a diagrammatic perspective view showing a cap of the fifth embodiment of the present medication bottle.
Figure 14:
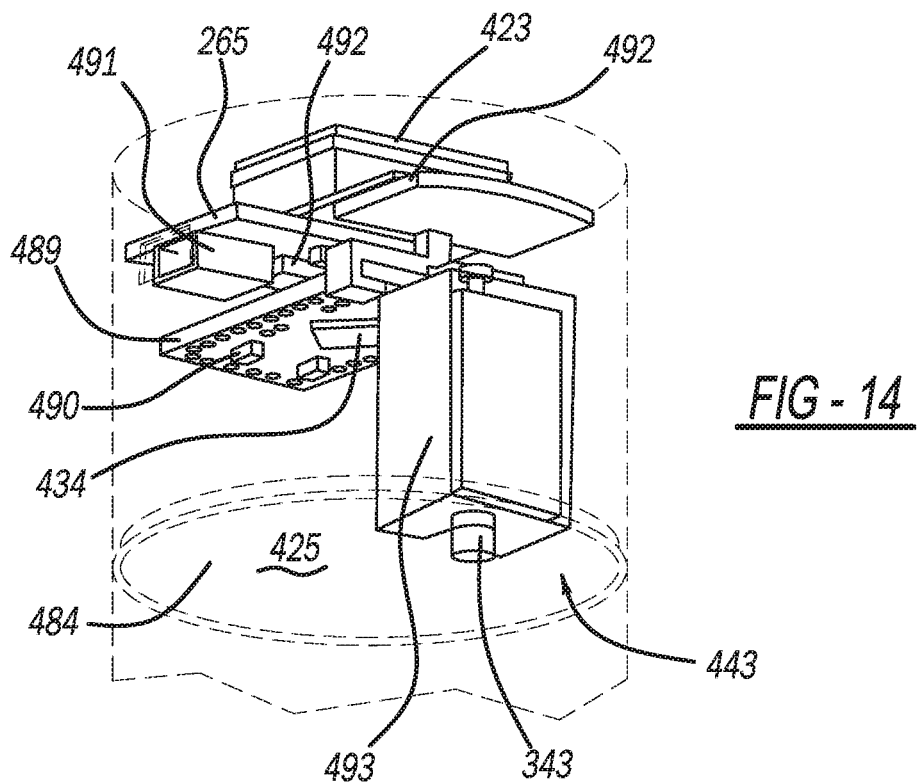
FIG. 14 is a perspective view showing the cap of the fifth embodiment of the present medication bottle.
Figure 15:
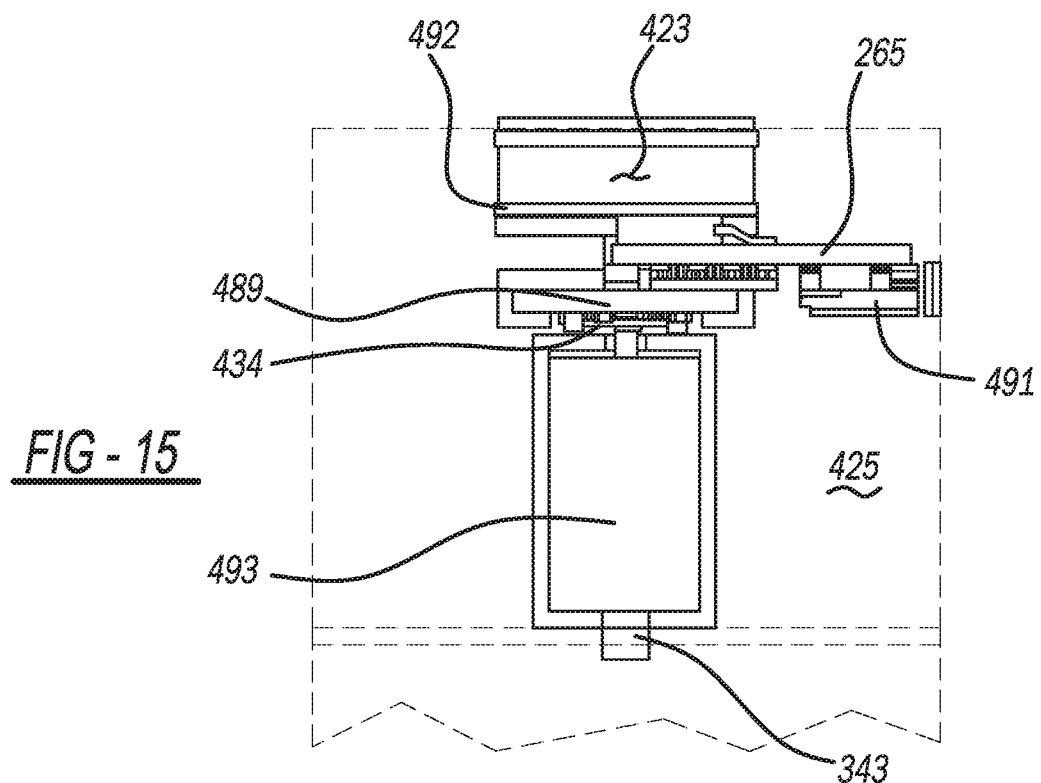
FIG. 15 is a side elevational view showing the cap of the fifth embodiment of the present medication bottle.

The container will now be described in greater detail with reference to FIGS. 10, 11 and 12. This fifth embodiment container 421 includes outer vial wall 403 and inner vial wall 405, both blow molded, injection molded or three-dimensionally printed from polymeric materials. Outer wall 403 includes a generally circular-cylindrical side wall section 495 (although it may have a 1-3° die-draw taper angle if molded) and a generally flat bottom wall section 496. The interior and exterior surfaces of outer wall 403 are smooth but for external threads 497 adjacent an openly accessible upper end 498.

Inner vial wall 405 has a generally cylindrical side wall section 499 and a bottom section 500 which generally align with the matching side and bottom sections of the outer wall 403. Channels 407 circumferentially extend around side section 499 of inner vial wall 405 in a circular manner coaxially about a rotational centerline 501 with annular projections 502 radially and outwardly projecting from side section 499 in a corrugation-like manner. Each inwardly offset channel 407 is disposed between a pair of adjacent annular projections 502. When inner vial wall 405 is inserted within the fluid contained in outer vial wall 403 during assembly, the aversive liquid fluid is pushed between the annular projections 502 and somewhat fills the annular compartments located between channels 407 and the interior surface of outer vial wall 403. Annular projections 502 contact against and are bonded to the interior surface outer wall 403. Furthermore, adhesive, ultrasonic or other bonding procedures may be used to sealingly affix each annular projection 502 to the interior surface of outer wall 403. There is also a concave depressed wall 503 within bottom section 500 of inner vial wall 405. This allows a channel compartment to be present between depressed wall 503 and an interior surface of bottom 496 of outer wall 403 to also receive the aversive fluid therein.

While various embodiments have been disclosed herein, it should be appreciated that other variations may be employed. For example, it is envisioned that the inner and outer vial walls may have other side and end view shapes, such as generally rectangular, generally square, generally hourglass or the like. The fluid containing channels may alternately be vertically oriented (as shown in FIGS. 1A-C) and parallel, diagonally oriented and parallel, crossing, side-view circles or rectangular or the like. Furthermore, it is alternately envisioned that the authentication sensors and electronics preferably disclosed herein as being internally mounted to the cap may alternately be mounted to the container. Moreover, other electromagnetic, purely magnetic, or mechanical lacking mechanisms may be substituted for the solenoid shown and described hereinabove. Any and/or all of the features of any of the embodiments disclosed herein may be mixed and matched, and/or substituted for any of the other embodiment structures and functions herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A medication bottle comprising:
   (a) an outer container wall;
   (b) an inner container wall comprising multiple separate compartments located between the inner and outer container walls, the compartments being further bordered by spaced apart projections of the container walls being in contact with each other along side wall sections thereof;
   (c) a cavity located within a center of the inner wall with an openly accessible end configured to receive medication;
   (d) an aversive liquid located in the compartments;

(e) a cap configured to be removably coupled to the outer container wall;
(f) a user-biometric sensor affixed to the cap; and
(g) at least a second sensor affixed to the cap.

2. The bottle of claim 1, wherein the biometric sensor includes a fingerprint scanner.

3. The bottle of claim 1, wherein the biometric sensor includes a user-viewing camera and software.

4. The bottle of claim 1, wherein the biometric sensor includes a user voice recognition microphone and software.

5. The bottle of claim 1, wherein the second sensor includes a camera viewing into the cavity.

6. The bottle of claim 1, wherein the second sensor includes an RFID reader.

7. The bottle of claim 1, further comprising an electromagnetic actuator and a lock mounted to the cap, authentication of the user by a microprocessor attached to the cap causing the actuator to move the lock which allows the user to open the cap.

8. The bottle of claim 1, wherein the aversive liquid is at least one of: (a) an emetic compound, (b) a pungent compound, or (c) a gastric irritant compound, which is released into the cavity through the inner container wall when undesired tampering of the bottle occurs, which causes the aversive liquid to contaminate the medication in the cavity.

9. A medication bottle comprising:
(a) an outer container wall including a side wall section and a bottom wall section;
(b) an inner container wall including a side wall section, corresponding with the side wall section of the outer container wall, and a bottom wall section substantially corresponding with the bottom wall section of the outer container wall;
(c) a user-accessible cavity being inside the inner container wall; and
(d) a medication-changing fluid located between the container walls in a nominal condition but the fluid moving into the cavity in a container-tampering condition; (e) multiple spaced apart channels defined between projections of the inner container wall which are bonded to the outer container wall, and the fluid being located in the channels in the nominal condition.

10. The bottle of claim 9, further comprising:
a cap removeably coupled to the outer container wall; and
at least one sensor mounted to the cap.

11. The bottle of claim 10, wherein the sensor is a biometric sensor.

12. The bottle of claim 10, wherein there are at least two of the sensors which sense different user-authentication features.

13. The bottle of claim 10, further comprising:
a lock mounted to the cap;
an electromagnetic actuator; and
authentication of the user by a microprocessor attached to the bottle causing the actuator to unlock the lock which allows the user to open the cap.

14. The bottle of claim 9, wherein the fluid is an aversive liquid is at least one of: (a) an emetic compound, (b) a pungent compound, or (c) a gastric irritant compound, which is released into the cavity through the inner container wall when undesired tampering of the bottle occurs, which causes the aversive liquid to contaminate medication in the cavity.

15. The bottle of claim 9, further comprising addictive or pain reducing tablet pills or capsules located in the cavity and operably covered by the fluid in the tampering condition.

16. A medication bottle comprising:
(a) an outer container wall;
(b) an inner container wall comprising multiple separate compartments located between the inner and outer container walls, the compartments being bordered by spaced apart portions of the container walls being in contact with each other along side wall sections thereof; and
(c) a user-accessible cavity being inside the inner container walls; (d) the compartments are fluid-carrying compartments which are each circular when viewed from an open top, and are coaxial with a centerline of the cavity which extends through the open top; and when one of the compartments ruptures during tampering, another of the compartments is configured to retain fluid therein.

17. The bottle of claim 16, further comprising:
a cap removeably coupled to the outer container wall; and
at least one sensor mounted to the cap.

18. The bottle of claim 16, further comprising an aversive liquid located in the compartments, the liquid being at least one of: (a) an emetic compound, (b) a pungent compound, or (c) a gastric irritant compound, which is released into the cavity through the inner container wall when undesired tampering of the bottle occurs, which causes the aversive liquid to contaminate medication in the cavity.

19. The bottle of claim 18, further comprising addictive or pain reducing tablet pills or capsules located in the cavity and operably contacted by the liquid in the tampering condition.

20. The bottle of claim 16, wherein:
there are at least four of the fluid compartments along side wall sections.

21. A medication bottle comprising:
(a) a medication-container;
(b) a cap removeably coupled to the container;
(c) a first sensor mounted on one of the container or cap;
(d) at least a second sensor mounted on one of the container or cap;
(e) an electrical circuit located on at least one of the container or cap;
(f) an actuator operably actuated by the circuit depending on user authentication by signals from the sensors;
(g) a lock operably locked and unlocked by the actuator, the lock securing the cap to the container if the user has not been authenticated;
(h) at least one of the sensors being a biometric sensor; and
(i) an aversive fluid being releasable into the container; (j) wherein the fluid is located within separate compartments between multiple walls of the container, the walls being attached together between the fluid compartments.

22. The bottle of claim 21, wherein the sensors and the circuit are mounted to the cap.

23. The bottle of claim 21, wherein the biometric sensor scans a user's fingerprint.

24. The bottle of claim 21, wherein at least one of the sensors includes a camera.

25. The bottle of claim 21, wherein one of the sensors includes an RFID reader.

26. A medication bottle apparatus comprising:
(a) a polymeric container including nested inner and outer walls;
(b) a cap removeably coupled to the container;
(c) a first sensor mounted on one of the container or cap;
(d) at least a second sensor;

(e) an electrical circuit located on at least one of the container or cap, connected to at least one of the sensors;
(f) a lock operably being unlocked to allow dispensing of medication in the container when the user has been authenticated with the sensors; and
(g) a fluid being releasable into the container to change a characteristic of the medication within the container if the container or the cap is in a tampered condition.

27. The bottle of claim 26, further comprising:
addictive or pain reducing tablet pills or capsules located in the cavity and operably contacted by the liquid in the tampering condition; and
at least one of the sensors being a biometric sensor.

28. The bottle of claim 26, wherein:
the sensors and the circuit are mounted to the cap;
the circuit includes a printed circuit board, a microprocessor, memory and a battery; and
the cap includes an internal helical thread.

29. The bottle of claim 26, further comprising:
an electromagnetic actuator is energized by the circuit and controls the lock; and
the fluid being located within separate compartments between the inner and outer walls of the container, the walls being attached together between fluid compartments between the walls.

* * * * *